United States Patent
Gulyas et al.

(10) Patent No.: US 11,920,014 B2
(45) Date of Patent: Mar. 5, 2024

(54) SEALING COMPOSITIONS FOR WATER SOLUBLE FILMS AND METHODS OF USING

(71) Applicants: Dow Global Technologies LLC, Midland, MI (US); Rohm and Haas Company, Collegeville, PA (US)

(72) Inventors: Gyongyi Gulyas, Lake Jackson, TX (US); An Kaga, Rosharon, TX (US); Thomas Fitzgibbons, Alvin, TX (US); Afua Sarpong Karikari, Bristol, PA (US); Michael C. Mitchell, King Prussia, PA (US); Xin Jin, Berwyn, PA (US); Joseph Kao, Framingham, MA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 997 days.

(21) Appl. No.: 16/603,601

(22) PCT Filed: Apr. 19, 2018

(86) PCT No.: PCT/US2018/028287
§ 371 (c)(1),
(2) Date: Oct. 8, 2019

(87) PCT Pub. No.: WO2018/212899
PCT Pub. Date: Nov. 22, 2018

(65) Prior Publication Data
US 2020/0062913 A1   Feb. 27, 2020

Related U.S. Application Data

(60) Provisional application No. 62/508,405, filed on May 19, 2017.

(51) Int. Cl.
| | | |
|---|---|---|
| *C08J 7/06* | (2006.01) |
| *C08J 5/12* | (2006.01) |
| *C08K 3/34* | (2006.01) |
| *C08K 5/00* | (2006.01) |
| *C08L 23/22* | (2006.01) |
| *C08L 29/14* | (2006.01) |
| *C08L 37/00* | (2006.01) |
| *C08L 39/06* | (2006.01) |
| *C08L 71/02* | (2006.01) |
| *C11D 17/04* | (2006.01) |

(52) U.S. Cl.
CPC .............. *C08J 7/065* (2013.01); *C08J 5/122* (2013.01); *C08K 3/346* (2013.01); *C08K 5/0016* (2013.01); *C08L 23/22* (2013.01); *C08L 29/14* (2013.01); *C08L 37/00* (2013.01); *C08L 39/06* (2013.01); *C08L 71/02* (2013.01); *C11D 17/042* (2013.01); *C08J 2300/14* (2013.01); *C08J 2329/04* (2013.01); *C08J 2339/06* (2013.01); *C08J 2371/02* (2013.01); *C08J 2471/02* (2013.01)

(58) Field of Classification Search
CPC ..................................................... C11D 17/042
See application file for complete search history.

(56) References Cited

U.S. PATENT DOCUMENTS

| | | | |
|---|---|---|---|
| 3,892,905 | A | 7/1975 | Albert |
| 4,818,549 | A | 4/1989 | Steiner et al. |
| 5,827,586 | A | 10/1998 | Yamashita et al. |
| 2003/0036494 | A1 | 2/2003 | Catlin et al. |
| 2003/0149385 | A1* | 8/2003 | Tsuruda ............... A61K 9/7076 602/20 |
| 2014/0356603 | A1* | 12/2014 | Kumar ..................... B32B 7/05 156/332 |
| 2015/0266638 | A1 | 9/2015 | Kumar et al. |
| 2020/0299473 | A1* | 9/2020 | Lee ........................... C08J 5/18 |

FOREIGN PATENT DOCUMENTS

| | | | |
|---|---|---|---|
| DE | 2523287 | A1 | 12/1976 |
| EP | 3025848 | A1 | 6/2016 |
| WO | WO-2004031271 | A2 * | 4/2004 ........... C11D 17/042 |
| WO | 2017105978 | A1 | 6/2017 |

OTHER PUBLICATIONS

Tasiopoulos, A. J., Perlepes, S.P.; Diol-type ligands as central 'players' in the chemistry of high-spin molecules and single-molecule magnets; Dalton Transactions, No. 41, Jan. 1, 2008 p. 5537.
Okhamafe, A.O., York, P.; Studiess of Interaction Phenomena in Aqueous-based Film Coatings Containing Soluble Additives using Thermal Analysis Techiques; Journal of Pharmaceutial Sciences, vol. 77. No. 5, May 1, 1988, p. 438-443.
Kearsley,M. W., Birch, G. G.; Carbohydrate/Iron Complex Formation; Food Chemistry, vol. 2, No. 3, Jul. 1, 1977; p. 209-217.
Wingender, J, Stamm, M.
Kim, "Vapor Pressures of Water + Lithium Chloride + Ethylene Glycol and Water + Lithium Chloride + Lithium Bromide + Ethylene Glycol", Journal of Chemical and Engineering Data., 1995, vol. 40, No. 2, pp. 496-498.
Pownceby, "Solid-Liquid Phase Diagram for the System MgCl 2—H 2 O-C 2 H 4 (OH) 2 at 333 K", Journal of Chemical and Engineering Data., 2010, vol. 55, No. 9, pp. 3759-3765.
Office Action from corresponding European Application No. 18726259.7 dated Oct. 5, 2023.

* cited by examiner

*Primary Examiner* — Daniel Jeremy Leeds
(74) *Attorney, Agent, or Firm* — Thomas S. Deibert

(57) ABSTRACT

A sealing composition for use in unit dose packages is provided, including: 70 to 98 wt % water; 1 to 30 wt % of a hydrogen bonding component; and 1 to 30 wt % of a complex forming component.

15 Claims, No Drawings

SEALING COMPOSITIONS FOR WATER SOLUBLE FILMS AND METHODS OF USING

The present invention relates to a sealing composition for use in unit dose packages. In particular, the present invention relates to a sealing composition for use in unit dose detergent packages, comprising: 70 to 98 wt % water; 1 to 30 wt % of a hydrogen bonding component; and 1 to 30 wt % of a complex forming component.

Conventional water-soluble polymeric films have found use as packaging materials that facilitate the simplification of dispersing, pouring, dissolving and dosing of materials to be delivered. For example, packages prepared from conventional water-soluble films are commonly used to contain a premeasured unit dose of a household care composition, such as, a dish or laundry detergent formulation. The consumer may then directly add the household care compositions containing package to a mixing vessel for use. This approach advantageously allows for the accurate dosing of the household care composition while eliminating the need for the consumer to have to measure out the composition. This approach also advantageously may reduce mess that might otherwise be associated with consumer dispensing of the composition.

Many conventional water-soluble films fail to adequately dissolve during use, e.g., during a laundry wash cycle, resulting in an undesirable film residue being deposited on the laundry. This concern may be exacerbated when the conditions of use introduce stressed wash conditions, such as when the package is used in cold water. Given the desire to reduce energy costs, consumers are increasingly in need of unit dosage systems that will perform reliably in cold water conditions.

Many conventional water-soluble films that do completely dissolve during use, e.g., during a laundry wash cycle, using cold water unfortunately exhibit an undesirable degree of sensitivity to moisture and humidity. That is, these films when incorporated into unit dose pouches exhibit insufficient storage stability, particularly when the contained detergent includes higher water concentrations. These films also display handling concerns when incorporated into unit does pouches (e.g., handling of the pouches with wet hands may result in the packages adhering to one another or leakage of their contents).

Conventional unit dose packages produced with films comprising polyvinyl alcohol polymers have addressed the some of the aforementioned issues with limited success. However, the cold water solubility of some polyvinyl alcohol films may decrease when contacted with certain detergent compositions. Consequently, as these unit dose packages age, the films may fail to adequately dissolve during a cold wash cycle, and may in turn leave undesirable film residue on items within the wash.

Conventional unit dose packages made from water-soluble films comprising polymers other than polyvinyl alcohol polymers may fail to adequately address the aforementioned concerns. For example, a polymeric film comprising starch and/or cellulosic materials may provide suitable water-drop resistance. However, to facilitate desirable cold water solubility such films may need to be made so thin that the resulting mechanical properties are compromised. Moreover, films comprising starch and/or cellulosic materials are more challenging to process given their mechanical properties as compared to films of like thickness comprising polyvinyl alcohol polymers.

Conventional film formulations fail to perform adequately. Thus, there remains a need for packets comprising water-soluble films having the desired characteristics of good cold water-solubility, water-drop resistance, and mechanical properties including, but not limited to, good processability.

There remains a need for water soluble films and unit dose packages produced therewith having the desired characteristics of good cold water-solubility, water-drop resistance, and mechanical properties, including, but not limited to, processability. There also remains a need for sealing compositions for use in unit dose packages that effectively seal such water soluble films.

The present invention provides a sealing composition for use in unit dose packages, comprising: 70 to 98 wt % water; 1 to 30 wt % of a hydrogen bonding component; and 1 to 30 wt % of a complex forming component.

The present invention provides a method of forming a unit dose package, comprising: providing a free standing film, comprising 19 to 85 wt % of a partially hydrolyzed polyvinyl acetate; providing a sealing composition according to the present invention; applying the sealing composition to a first surface of the free standing film; contacting a second surface of the free standing film with the sealing composition applied on the first surface to form a seal between the first surface and the second surface.

The present invention provides a method of forming a unit dose package, comprising: providing a free standing film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 0 to 10 wt % of a poly(isobutylene-co-maleic anhydride) copolymer, wherein the poly(isobutylene-co-maleic anhydride) copolymer is at least partially neutralized; and 0 to 10 wt % of an optional additive; providing a sealing composition according to the present invention; applying the sealing composition to a first surface of the free standing film; contacting a second surface of the free standing film with the sealing composition applied on the first surface to form a seal between the first surface and the second surface.

The present invention provides a method of forming a unit dose package, comprising: providing a free standing film, comprising 19 to 85 wt % of a partially hydrolyzed polyvinyl acetate; providing a detergent formulation, comprising: 14 to 60 wt % of a surfactant; 3 to 25 wt % of a salt; and 20 to 75 wt % of water; providing a sealing composition according to the present invention; applying the sealing composition to a first surface of the free standing film; contacting a second surface of the free standing film with the sealing composition applied on the first surface to form a seal between the first surface and the second surface; wherein the free standing film forms a cavity; wherein the detergent formulation is disposed within the cavity; wherein the cavity is encapsulated by the free standing film with the seal between the first surface and the second surface; and wherein the detergent formulation is in contact with the free standing film.

The present invention provides a unit dose package produced by the method of the present invention.

DETAILED DESCRIPTION

We have found a unique sealing composition for use in unit dose packages for sealing a water soluble film formulation that exhibits improved resistance to detergent formulations with a high water content (i.e., ≥20 wt %). Unit dose packages made using the sealing composition of the present invention facilitate the forming of unit dose packages having incorporation of high water content detergent formulations, exhibit acceptable storage stability and water solubility in use post storage.

Unless otherwise indicated, ratios, percentages, parts, and the like are by weight.

As used herein, unless otherwise indicated, the phrase "molecular weight" or Mw refers to the weight average molecular weight as measured in a conventional manner with gel permeation chromatography (GPC) and polyacrylic acid standards. GPC techniques are discussed in detail in Modem Size Exclusion Chromatography, W. W. Yau, J. J. Kirkland, D. D. Bly; Wiley-lnterscience, 1979, and in A Guide to Materials Characterization and Chemical Analysis, J. P. Sibilia; VCH, 1988, p. 81-84. Molecular weights are reported herein in units of Daltons.

The term "polymer" as used herein and in the appended claims refers to a compound prepared by polymerizing monomers, whether of the same or a different type. The generic term "polymer" includes the terms "homopolymer," "copolymer," and "terpolymer."

The term "water soluble" as used herein in reference to a free standing film of the present invention means that a sample of the free standing film (0.5"×1.5"×76 μm) when placed in 20 mL of tap water having a temperature of 5 to 25° C. in a sample vial; left to sit undisturbed for two (2) minutes; then shaken for sixty (60) seconds and then filtered through a 0.025 mm mesh screen, wherein only a slight haze is perceptible and no residue or grit is observed according to the procedure set forth herein in the Examples. Preferably, the free standing films of the present invention are also water soluble based on film solubility tests conducted according to MSTM (MonoSol Standard Test Method) 205 in distilled water at 25° C.

Preferably, the sealing composition for use in unit dose package (preferably, unit dose detergent package; more preferably, a unit dose laundry detergent package or a unit dose dish detergent package; most preferably, a unit dose laundry detergent package) of the present invention, comprises: 69 to 98 wt % (preferably, 69 to <98 wt %; more preferably, 80 to 95 wt %; most preferably, 87.5 to 92.5 wt %) water; 1 to 30 wt % (preferably, >1 to 30 wt %; more preferably, 2 to 15 wt %; most preferably, 2 to 12.5 wt %) of a hydrogen bonding component; and 1 to 30 wt % (preferably, >1 to 30 wt %; more preferably, 2 to 15 wt %; most preferably, 2 to 12.5 wt %) of a complex forming component.

Preferably, the hydrogen bonding component used in the sealing composition of the present invention is selected from the group consisting of polyols, polyacids and mixtures thereof. More preferably, the hydrogen bonding component used in the sealing composition of the present invention is selected from the group consisting of polyols, polyacids and mixtures thereof; wherein the polyols are selected from the group consisting of diols having an average of two hydroxyl groups per molecule and a molecular weight of 48 to 200 g/mol (preferably, 50 to 150 g/mol; more preferably, 55 to 125 g/mol; most preferably, 60 to 100 g/mol) and wherein the polyacids are selected from the group having an average of at least two (preferably, two to four; more preferably, two to three; most preferably, three) carboxylic acid groups per molecule and a molecular weight of 90 to 500 g/mol (preferably, 90 to 250 g/mol; more preferably, 150 to 225 g/mol; most preferably, 170 to 200 g/mol). Still more preferably, the hydrogen bonding component used in the sealing composition of the present invention is selected from the group consisting of polyols, polyacids and mixtures thereof; wherein the polyols are selected from the group consisting of methanediol (48.04 g/mol); ethylene-1,2-diol (62.07 g/mol); propane-1,3-diol (76.10 g/mol); propane-1,2-diol (76.10 g/mol); butane-1,2-diol (90.12 g/mol); butane-1,3-diol (90.12 g/mol); butane-1,4-diol (90.12 g/mol) and mixtures thereof; and the polyacids are selected from the group consisting of di-carboxylic acids, tri-carboxylic acids and mixtures thereof (more preferably, wherein the di-carboxylic acids are selected from the group consisting of oxalic acid (90.03 g/mol); malonic acid (104.0615 g/mol); maleic acid (116.072 g/mol); succinic acid (118.09 g/mol); itaconic acid (130.099 g/mol); glutaric acid (132.12 g/mol); aspartic acid (133.11 g/mol); iminodiacetic acid (133.10 g/mol); malic acid (134.0874 g/mol); adipic acid (146.1412 g/mol); pimelic acid (160.17 g/mol); suberic acid (174.2 g/mol); azelaic acid (188.22 g/mol); sebacic acid (202.25 g/mol) and mixtures thereof; and wherein the tri-carboxylic acids are selected from the group consisting of citric acid (192.124 g/mol), isocitric acid (192.124 g/mol), cis-aconitic acid (174.11 g/mol), trans-aconitic acid (174.11 g/mol), propane-1,2,3-tricarboxylic acid (176.12 g/mol), and mixtures thereof). Most preferably, the hydrogen bonding component used in the sealing composition of the present invention is selected from the group consisting of ethylene-1,2-diol; propane-1,3-diol; butane-1,4-diol; citric acid and mixtures thereof.

Preferably, the complex forming component used in the sealing composition of the present invention is selected from the group consisting of alkali metal salts, alkaline earth metal salts and mixtures thereof. More preferably, the complex forming component used in the sealing composition of the present invention is selected from the group consisting of alkali metal halides, alkaline earth metal halides and mixtures thereof. Still more preferably, the complex forming component used in the sealing composition of the present invention is selected from the group consisting of lithium chloride, sodium chloride, potassium chloride, magnesium chloride, calcium chloride and mixtures thereof. Most preferably, the complex forming component used in the sealing composition of the present invention is selected from the group consisting of magnesium chloride, calcium chloride, lithium chloride and mixtures thereof.

Preferably, the method of forming a unit dose package of the present invention, comprises: providing a free standing film; providing a sealing composition of the present invention, wherein the sealing composition comprises: 69 to 98 wt % (preferably, 69 to <98 wt %; more preferably, 80 to 95 wt %; most preferably, 87.5 to 92.5 wt %) water; 1 to 30 wt % (preferably, >1 to 30 wt %; more preferably, 2 to 15 wt %; most preferably, 2 to 12.5 wt %) of a hydrogen bonding component (as described above); and 1 to 30 wt % (preferably, >1 to 30 wt %; more preferably, 2 to 15 wt %; most preferably, 2 to 12.5 wt %) of a complex forming component (as described above); applying the sealing composition to a first surface of the free standing film; contacting a second surface of the free standing film with the sealing composition applied on the first surface to form a seal between the first surface and the second surface. Preferably, in the method of forming a unit dose package of the present invention, the first surface and the second surface are on different portions of a single sheet of the free standing film (e.g., wherein the free standing film is folded over onto itself). Preferably, in the method of forming a unit dose package of the present invention, the first surface and the second surface are on separate sheets of the free standing film (e.g., wherein separate sheets of the free standing film are overlapped or stacked together with the sealing composition interposed between some portion of the sheets).

Preferably, the free standing film provided in the method of forming a unit dose package of the present invention, comprises: 19 to 85 wt % (preferably, 20 to 80 wt %; more preferably, 30 to 75 wt %; most preferably, 34 to 70 wt %) of a partially hydrolyzed polyvinyl acetate.

Preferably, the partially hydrolyzed polyvinyl acetate used in the free standing film provided in the method of forming a unit dose package of the present invention is 80 to 98% hydrolyzed. More preferably, the partially hydrolyzed polyvinyl acetate used in the free standing film provided in the method of forming a unit dose package of the present invention is 84 to 95% hydrolyzed. Still more preferably, the partially hydrolyzed polyvinyl acetate used in the free standing film provided in the method of forming a unit dose package of the present invention is 86 to 92% hydrolyzed. Most preferably, the partially hydrolyzed polyvinyl acetate used in the free standing film provided in the method of forming a unit dose package of the present invention is 87 to 90% hydrolyzed.

Preferably, the partially (preferably, 80 to 98%; more preferably, 84 to 95%; still more preferably, 86 to 92%; most preferably, 87 to 90%) hydrolyzed polyvinyl acetate used in the free standing film provided in the method of forming a unit dose package of the present invention has a weight average molecular weight of 10,000 to 250,000 Daltons. More preferably, the partially (preferably, 80 to 98%; more preferably, 84 to 95%; still more preferably, 86 to 92%; most preferably, 87 to 90%) hydrolyzed polyvinyl acetate used in the free standing film provided in the method of forming a unit dose package of the present invention has a weight average molecular weight of 20,000 to 200,000 Daltons. Still more preferably, the partially (preferably, 80 to 98%; more preferably, 84 to 95%; still more preferably, 86 to 92%; most preferably, 87 to 90%) hydrolyzed polyvinyl acetate used in the free standing film provided in the method of forming a unit does package of the present invention has a weight average molecular weight of 40,000 to 160,000 Daltons. Most preferably, the partially (preferably, 80 to 98%; more preferably, 84 to 95%; still more preferably, 86 to 92%; most preferably, 87 to 90%) hydrolyzed polyvinyl acetate used in the free standing film provided in the method of forming a unit dose package of the present invention has a weight average molecular weight of 130,000 to 150,000 Daltons.

Preferably, the free standing film provided in the method of forming a unit dose package of the present invention, comprises 19 to 85 wt % of the partially (preferably, 80 to 98%; more preferably, 84 to 95%; still more preferably, 86 to 92%; most preferably, 87 to 90%) hydrolyzed polyvinyl acetate based on weight of the free standing film. More preferably, the free standing film provided in the method of forming a unit dose package of the present invention, comprises 20 to 80 wt % of the partially (preferably, 80 to 98%; more preferably, 84 to 95%; still more preferably, 86 to 92%; most preferably, 87 to 90%) hydrolyzed polyvinyl acetate based on weight of the free standing film. Still more preferably, the free standing film provided in the method of forming a unit dose package of the present invention, comprises 30 to 75 wt % of the partially (preferably, 80 to 98%; more preferably, 84 to 95%; still more preferably, 86 to 92%; most preferably, 87 to 90%) hydrolyzed polyvinyl acetate based on weight of the free standing film. Most preferably, the free standing film provided in the method of forming a unit does package of the present invention, comprises 34 to 70 wt % of the partially (preferably, 80 to 98%; more preferably, 84 to 95%; still more preferably, 86 to 92%; most preferably, 87 to 90%) hydrolyzed polyvinyl acetate based on weight of the free standing film.

Preferably, the free standing film provided in the method of forming a unit dose package of the present invention, comprises 19 to 85 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 160,000; most preferably, 130,000 to 150,000) Daltons. More preferably, the free standing film provided in the method of forming a unit dose package of the present invention, comprises 20 to 80 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 160,000; most preferably, 130,000 to 150,000) Daltons. Still more preferably, the free standing film provided in the method of forming a unit dose package of the present invention, comprises 30 to 75 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 160,000; most preferably, 130,000 to 150,000) Daltons. Most preferably, the free standing film provided in the method of forming a unit dose package of the present invention, comprises 34 to 70 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 160,000; most preferably, 130,000 to 150,000) Daltons.

Preferably, the free standing film provided in the method of forming a unit dose package of the present invention, further comprises: 5 to 70 wt % (preferably, 6 to 65 wt %; more preferably, 7.5 to 50 wt %; most preferably, 10 to 15 wt %) of a poly(ethylene oxide); 1 to 35 wt % (preferably, 2 to 35 wt %; more preferably, 3 to 35 wt %; most preferably, 4 to 7.5 wt %) of a polyalkylene glycol; 0.5 to 25 wt % (preferably 10 to 25 wt %; more preferably, 10 to 20 wt %; most preferably, 12 to 20 wt %) of a plasticizer; 0 to 10 wt % (preferably, 1 to 7.5 wt %; more preferably, 3 to 6 wt %; most preferably, 4 to 5.5 wt %) of a poly(isobutylene-co-maleic anhydride) copolymer, wherein the poly(isobutylene-co-maleic anhydride) copolymer is at least partially neutralized; and 0 to 10 wt % of an optional additive.

Preferably, the free standing film provided in the method of forming a unit dose package of the present invention, further comprises 5 to 70 wt % of the poly(ethylene oxide), based on weight of the free standing film. More preferably, the free standing film provided in the method of forming a unit dose package of the present invention, further comprises 6 to 65 wt % of the poly(ethylene oxide), based on weight of the free standing film. Still more preferably, the free standing film provided in the method of forming a unit dose package of the present invention, further comprises 7.5 to 50 wt % of the poly(ethylene oxide), based on weight of the free standing film. Most preferably, the free standing film provided in the method of forming a unit dose package of the present invention, further comprises 10 to 15 wt % of the poly(ethylene oxide), based on weight of the free standing film.

Preferably, the free standing film provided in the method of forming a unit dose package of the present invention, further comprises 5 to 70 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. More preferably, the free standing film provided in the method of forming a unit dose package of the present invention, further comprises 6 to 65 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. Still more preferably, the free standing film provided in the method of forming a unit dose package of the present invention, further comprises 7.5 to 50 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. Most preferably, the free standing film provided in the method of forming a unit dose package of the present invention, further comprises 10 to 15 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons.

Preferably, the free standing film provided in the method of forming a unit dose package of the present invention, further comprises 1 to 35 wt % of the polyalkylene glycol, based on weight of the free standing film. More preferably, the free standing film provided in the method of forming a unit does package of the present invention, further comprises 2 to 35 wt % of the polyalkylene glycol, based on weight of the free standing film. Still more preferably, the free standing film provided in the method of forming a unit does package of the present invention, further comprises 3 to 35 wt % of the polyalkylene glycol, based on weight of the free standing film. Most preferably, the free standing film provided in the method of forming a unit dose package of the present invention, further comprises 4 to 7.5 wt % of the polyalkylene glycol, based on weight of the free standing film.

Preferably, the free standing film provided in the method of forming a unit dose package of the present invention, further comprises 1 to 35 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons. More preferably, the free standing film provided in the method of forming a unit dose package of the present invention, further comprises 2 to 35 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons. Still more preferably, the free standing film provided in the method of forming a unit dose package of the present invention, further comprises 3 to 35 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons. Most preferably, the free standing film provided in the method of forming a unit dose package of the present invention, further comprises 4 to 7.5 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons.

Preferably, the polyalkylene glycol used in the free standing film provided in the method of forming a unit dose package of the present invention is a random copolymer of ethylene oxide and propylene oxide. More preferably, the polyalkylene glycol used in the free standing film provided in the method of forming a unit dose package of the present invention is a random copolymer of ethylene oxide and propylene oxide, wherein the polyalkylene glycol has a weight average molecular weight of 250 to 5,300 Daltons. Still more preferably, the polyalkylene glycol used in the free standing film provided in the method of forming a unit dose package of the present invention is a random copolymer of ethylene oxide and propylene oxide, wherein the polyalkylene glycol has a weight average molecular weight of 500 to 1,500 Daltons. Yet still more preferably, the polyalkylene glycol used in the free standing film provided in the method of forming a unit dose package of the present invention is a random copolymer of ethylene oxide and propylene oxide, wherein the polyalkylene glycol has a weight average molecular weight of 750 to 1,200 Daltons. Most preferably, the polyalkylene glycol used in the free standing film provided in the method of forming a unit dose package of the present invention is a random copolymer of ethylene oxide and propylene oxide, wherein the polyalkylene glycol has a weight average molecular weight of 800 to 1,000 Daltons.

Preferably, the free standing film provided in the method of forming a unit dose package of the present invention, further comprises 1 to 35 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons. More preferably, the free standing film provided in the method of forming a unit dose package of the present invention, further comprises 2 to 35 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons. Still more preferably, the free standing film provided in the method of forming a unit dose package of the present invention, further comprises 3 to 35 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons. Most preferably, the free standing film provided in the method of forming a unit dose package of the present invention, further comprises 4 to 7.5 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons.

Preferably, the free standing film provided in the method of forming a unit dose package of the present invention, further comprises 0.5 to 25 wt % of a plasticizer, based on weight of the free standing film. More preferably, the free standing film provided in the method of forming a unit dose package of the present invention, further comprises 10 to 25 wt % of a plasticizer, based on weight of the free standing film. Still more preferably, the free standing film provided in the method of forming a unit dose package of the present invention, further comprises 10 to 20 wt % of a plasticizer, based on weight of the free standing film. Most preferably, the free standing film provided in the method of forming a unit dose package of the present invention, further comprises 12 to 20 wt % of a plasticizer, based on weight of the free standing film.

Preferably, the plasticizer used in the free standing film provided in the method of forming a unit does package of the present invention is selected from organic triols, diols and glycols. More preferably, the plasticizer used in the free standing film provided in the method of forming a unit dose package of the present invention is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol; 2-methyl-1, 3-propanediol; diethylene glycol; triethylene glycol; and mixtures thereof. Still more preferably, the plasticizer used in the free standing film provided in the method of forming a unit dose package of the present invention is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol and mixtures thereof. Most preferably, the plasticizer used in the free standing film provided in the method of forming a unit dose package of the present invention is 1,4-butanediol and 1,2,3-propanetriol.

Preferably, the free standing film provided in the method of forming a unit dose package of the present invention, further comprises 0 to 10 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). More preferably, the free standing film provided in the method of forming a unit dose package of the present invention, further comprises 1 to 7.5 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). Still more preferably, the free standing film provided in the method of forming a unit dose package of the present invention, further comprises 3 to 6 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). Most preferably, the free standing film provided in the method of forming a unit dose package of the present invention, further comprises 4 to 5.5 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%).

Preferably, the poly(isobutylene-co-maleic anhydride) copolymer used in the free standing film provided in the method of forming a unit dose package of the present invention has a weight average molecular weight of 50,000 to 500,000 Daltons. More preferably, the poly(isobutylene-co-maleic anhydride) copolymer used in the free standing film provided in the method of forming a unit dose package of the present invention has a weight average molecular weight of 75,000 to 250,000 Daltons. Still more preferably, the poly(isobutylene-co-maleic anhydride) copolymer used in the free standing film provided in the method of forming a unit dose package of the present invention has a weight average molecular weight of 100,000 to 200,000 Daltons. Most preferably, the poly(isobutylene-co-maleic anhydride) copolymer used in the free standing film provided in the method of forming a unit dose package of the present invention has a weight average molecular weight of 140,000 to 180,000 Daltons.

Preferably, the free standing film provided in the method of forming a unit dose package of the present invention, further comprises 0 to 10 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. More preferably, the free standing film provided in the method of forming a unit dose package of the present invention, further comprises 1 to 7.5 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. Still more preferably, the free standing film provided in the method of forming a unit dose package of the present invention, further comprises 3 to 6 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. Most preferably, the free standing film provided in the method of forming a unit dose package of the present invention, further comprises 4 to 5.5 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons.

Preferably, the poly(isobutylene-co-maleic anhydride) copolymer used is at least partially neutralized with at least one of an alkali earth metal hydroxide, an alkaline earth metal hydroxide and an ionomer, wherein the degree of neutralization is 50 to 100% (more preferably, 75 to 100%; most preferably, 95 to 100%). More preferably, the poly (isobutylene-co-maleic anhydride) copolymer used is at least partially neutralized with at least one of an alkali earth metal hydroxide and an alkaline earth metal hydroxide, wherein the degree of neutralization is 50 to 100% (more preferably, 75 to 100%; most preferably, 95 to 100%). Most preferably, the poly(isobutylene-co-maleic anhydride) copolymer used is at least partially neutralized with at least one of sodium hydroxide, potassium hydroxide, magnesium hydroxide and calcium hydroxide, wherein the degree of neutralization is 50 to 100% (more preferably, 75 to 100%; most preferably, 95 to 100%).

Preferably, the free standing film provided in the method of forming a unit dose package of the present invention, further comprises 0 to 1.8 wt % (more preferably, 0.01 to 1.8 wt %) of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). More preferably, the free standing film provided in the method of forming a unit dose package of the present invention, further comprises 0.01 to 1.0 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Still more preferably, the free standing film provided in the method of forming a unit dose package of the present invention, further comprises 0.05 to 0.5 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Most preferably, the free standing film provided in the method of forming a unit dose package of the present invention, further comprises 0.08 to 0.20 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1).

Preferably, the polyvinyl pyrrolidone used in the free standing film provided in the method of forming a unit dose package of the present invention has a weight average molecular weight of 5,000 to 2,000,000 Daltons. More preferably, the polyvinyl pyrrolidone used in the free standing film provided in the method of forming a unit dose package of the present invention has a weight average molecular weight of 10,000 to 1,500,000 Daltons. Still more preferably, the polyvinyl pyrrolidone used in the free standing film provided in the method of forming a unit dose package of the present invention has a weight average molecular weight of 20,000 to 100,000 Daltons. Most preferably, the polyvinyl pyrrolidone used in the free standing film provided in the method of forming a unit dose package of the present invention has a weight average molecular weight of 20,000 to 50,000 Daltons.

Preferably, the free standing film provided in the method of forming a unit dose package of the present invention, further comprises 0 to 1.8 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). More preferably, the free standing film provided in the method of forming a unit dose package of the present invention, further comprises 0.01 to 1.0 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Still more preferably, the free standing film provided in the method of forming a unit dose package of the present invention, further comprises 0.05 to 0.50 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Most preferably, the free standing film provided in the method of forming a unit dose package of the present invention, further comprises 0.08 to 0.20 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1).

Preferably, the free standing film provided in the method of forming a unit dose package of the present invention, further comprises 0 to 10 wt % of an optional additive. Preferably, the optional additive used in the free standing film provided in the method of forming a unit dose package of the present invention is selected from the group consisting of a preservative, an antioxidant, a viscosity modifier, a solubility modifier, an antimicrobial agent, a binder, a chelating, a filler, an extender, a crosslinking agent (e.g., a bivalent metal cation), a defoamer, a salt, a lubricant, a release agent, an anti-blocking agent, a tackifier, a coalescent, a detackifying agent and a nanoparticle (e.g., silicate type nanoclay).

Preferably, the free standing film provided in the method of forming a unit dose package of the present invention, further comprises 0 to 10 wt % of an optional additive, wherein the optional additive includes a nanoparticle (preferably, a silicate type nanoclay). More preferably, the free standing film provided in the method of forming a unit dose package of the present invention, further comprises 0.05 to 1 wt % (more preferably, 0.1 to 0.5 wt %; most preferably, 0.1 to 0.3 wt %) of a nanoparticle (preferably, a silicate type nanoclay). Most preferably, the free standing film provided in the method of forming a unit dose package of the present invention, further comprises 0.1 to 0.3 wt % of a nanoparticle (preferably, a silicate type nanoclay).

Preferably, the free standing film provided in the method of forming a unit dose package of the present invention, further comprises 0 to 10 wt % of an optional additive, wherein the optional additive includes a defoamer. More preferably, the free standing film provided in the method of forming a unit dose package of the present invention, further comprises 1 to 10 wt % (more preferably, 2 to 7.5 wt %; most preferably, 3 to 6 wt %) of an defoamer. Most preferably, the free standing film provided in the method of forming a unit dose package of the present invention further comprises 3 to 6 wt % of a defoamer.

Preferably, the free standing film provided in the method of forming a unit dose package of the present invention, further comprises 0 to 10 wt % of an optional additive, wherein the optional additive includes a crosslinking agent. More preferably, the free standing film provided in the method of forming a unit dose package of the present invention, further comprises 0.1 to 10 wt % (more preferably, 0.1 to 5 wt %; still more preferably, 0.2 to 3 wt %; most preferably, 0.3 to 1 wt %) of a crosslinking agent.

Preferably, the crosslinking agent used in the free standing film provided in the method of forming a unit dose package of the present invention is an ionic crosslinking agent. More preferably, the crosslinking agent used in the free standing film provided in the method of forming a unit dose package of the present invention is selected from the group of cations consisting of $Ca^{2+}$, $Mg^{2+}$, $Al^{2+}$, $Al^{3+}$, $Zn^{2+}$ and mixtures thereof. Still more preferably, the crosslinking agent used in the free standing film provided in the method of forming a unit dose package of the present invention is selected from the group of cations consisting of $Ca^{2+}$, $Zn^{2+}$ and mixtures thereof. Preferably, the cations are provided as a water soluble inorganic salt or complex, for example, $CaCl_2$, $ZnO$, Zinc ammonium bicarbonate.

Preferably, the free standing film provided in the method of forming a unit dose package of the present invention is water soluble.

Preferably, the free standing film provided in the method of forming a unit dose package of the present invention is cold water soluble.

The water soluble films provided in the method of forming a unit dose package of the present invention can be prepared by techniques known to those skilled in the art including, for example, via solution casting on a substrate, such as glass, polyethylene terephthalate (PET) or metal. Typically, water is used as the solvent for the solution casting, although other solvents may be used. Following casting, the films may be dried by heating at elevated temperature, for instance 65-80° C.

Preferably, the free standing film provided in the method of forming a unit dose package of the present invention is shaped using techniques known to those skilled in the art to form a cavity. More preferably, the free standing film provided in the method of forming a unit dose package of the present invention is shaped to form a cavity, wherein the cavity is at least partially encapsulated by the free standing film.

Preferably, the method of forming a unit dose package of the present invention, comprises applying the sealing composition to a first surface of the free standing film, wherein the sealing composition is applied to a first surface of the free standing film using techniques known to those skilled in the art including brush coating, spray coating, dip coating and printing.

Preferably, the method of forming a unit dose package of the present invention, comprises contacting a second surface of the free standing film with the sealing composition applied on the first surface to form a seal between the first surface and the second surface, wherein the first and second surface are pressed together with the sealing composition interposed therebetween. More preferably, the method of forming a unit dose package of the present invention, comprises contacting a second surface of the free standing film with the sealing composition applied on the first surface to form a seal between the first surface and the second surface, wherein the first and second surface are pressed together and heated with the sealing composition interposed therebetween. Most preferably, the method of forming a unit dose package of the present invention, comprises contacting a second surface of the free standing film with the sealing composition applied on the first surface to form a seal between the first surface and the second surface, wherein the first and second surface are pressed together and heated to a temperature of 25 to 80° C. (more preferably, 30 to 60° C.; still more preferably, 30 to 50° C.; most preferably, 35 to 45° C.) with the sealing composition interposed therebetween.

Preferably, the method of forming a unit dose package of the present invention, further comprises: providing a detergent formulation, comprising: 14 to 60 wt % (preferably, 20 to 50 wt %; more preferably, 25 to 47.5 wt %; still more preferably, 30 to 45 wt %; most preferably, 40 to 42 wt %) of a surfactant; 3 to 25 wt % (preferably, 3 to 20 wt %; more preferably, 4 to 15 wt %; still more preferably, 5 to 10 wt %; most preferably, 5 to 7 wt %) of a salt; and 20 to 75 wt % (preferably, 30 to 70 wt % water; more preferably, 40 to 65 wt %; most preferably, 45 to 60 wt %) of a water; wherein the free standing film forms a cavity; wherein the detergent formulation is disposed within the cavity; wherein the cavity is encapsulated by the free standing film with the seal between the first surface and the second surface; and wherein the detergent formulation is in contact with the free standing film.

Preferably, the surfactant used in the detergent formulation provided in the method of forming a unit dose package of the present invention is selected from the group consisting of cationic, anionic, nonionic, fatty acid metal salt, zwitterionic (e.g., betaine surfactants) and mixtures thereof.

The amount of salt noted in the detergent formulation provided in the method of forming a unit dose package of the present invention does not include any anionic or cationic surfactants that may be present in the detergent.

Preferably, the salt used in the detergent formulation provided in the method of forming a unit dose package of the present invention has no more than ten (more preferably, no more than six; most preferably, no more than 3) carbon atoms. Preferably, the salt used in the detergent formulation provided in the method of forming a unit dose package of the present invention is selected from the group consisting of chlorides, citrates, phosphates, sulfates, carbonates, metalsilicates and aluminosilicates. Preferably, the cations of the salt used in the detergent formulation provided in the method of forming a unit dose package of the present invention are selected from alkali metal ions, ammonium ions and mixtures thereof. Preferably, the detergent formulation provided in the method of forming a unit dose package of the present invention, comprises a salt selected from the group consisting of sodium chloride, ammonium chloride and ammonium sulfate. More preferably, the detergent formulation provided in the method of forming a unit dose package of the present invention, comprises a salt selected from the group consisting of sodium chloride, ammonium chloride and mixtures thereof.

Preferably, the detergent formulation provided in the method of forming a unit dose package of the present invention, further comprises an optional component selected from the group consisting of a preservative, an antioxidant, a viscosity modifier, a solubility modifier, an antimicrobial agent, a binder, a chelating agent, a fungicide, an aesthetics enhancer and a filler.

Preferably, the pH of the detergent formulation provided in the method of forming a unit dose package of the present invention is 4.5 to 11 (more preferably, 7 to 10). Suitable bases to adjust the pH of the detergent formulation include mineral bases such as sodium hydroxide and potassium hydroxide; ammonium hydroxide; and organic bases such as mono-, di- or tri-ethanolamine; or 2-dimethylamino-2-methyl-1-propanol (DMAMP). Mixtures of bases may be used.

Preferably, the unit dose package formed by the method of the present invention, comprises: a free standing film and a detergent formulation as described above. More preferably, the unit dose package formed by the method of the present invention, comprises: a free standing film; and a detergent formulation; wherein the free standing film forms a cavity; wherein the detergent formulation is disposed within the cavity; and wherein the detergent formulation is in contact with the free standing film. Most preferably, the unit dose package provided by the method of the present invention, comprises: a free standing film and a detergent formulation as described above; wherein the free standing film forms a cavity; wherein the detergent formulation is disposed within the cavity; wherein the free standing film encapsulates the cavity; and wherein the detergent formulation is in contact with the free standing film.

Preferably, the unit dose package provided by the method of the present invention, comprises: a free standing film and a detergent formulation as described above; wherein the free standing film forms a cavity; wherein the detergent formulation is disposed within the cavity; wherein the free standing film encapsulates the cavity; wherein the detergent formulation is in contact with the free standing film; and wherein the unit dose package is a unit dose detergent package. More preferably, the unit dose package provided by the method of the present invention, comprises: a free standing film and a detergent formulation as described above; wherein the free standing film forms a cavity; wherein the detergent formulation is disposed within the cavity; wherein the free standing film encapsulates the cavity; wherein the detergent formulation is in contact with the free standing film; and wherein the unit dose package is a unit dose dish detergent package or a unit dose laundry detergent package. Most preferably, the unit dose package provided by the method of the present invention, comprises: a free standing film and a detergent formulation as described above; wherein the free standing film forms a cavity; wherein the detergent formulation is disposed within the cavity; wherein the free standing film encapsulates the cavity; wherein the detergent formulation is in contact with the free standing film; and wherein the unit dose package is a unit dose laundry detergent package.

Preferably, the water soluble film used in the unit dose package formed by the method of the present invention is stable in the presence of high ionic strength detergents (containing salts in amounts as described above). In use, the detergent contents of the unit dose package formed by the method of the present invention may be released by exposing the unit dose package to low ionic strength water (e.g., containing less than 3 wt % salts), for instance as may be encountered during the wash cycle of a laundry machine. Following such exposure, the water soluble film will readily disintegrate, releasing the detergent formulation into the surroundings.

Some embodiments of the present invention will now be described in detail in the following Examples.

Film Forming Compositions

Film forming compositions were prepared for each of Compositions of FC1 and F1-F21 by mixing together the components in the weight proportions listed in TABLES 1-3.

TABLE 1

| Film Comp. | A1 (wt %) | B1 (wt %) | B2 (wt %) | C1 (wt %) | C2 (wt %) | D1 (wt %) | E1 (wt %) | F1 (wt %) | F2 (wt %) | G (wt %) | H (wt %) | I (wt %) | J (wt %) |
|---|---|---|---|---|---|---|---|---|---|---|---|---|---|
| FC1 | 0.00 | 41.70 | — | — | 23.70 | 10.70 | — | 18.40 | — | — | 0.90 | — | 4.60 |
| F1 | 18.30 | — | 61.30 | 7.60 | — | 9.70 | — | — | — | — | — | — | 3.10 |
| F2 | 19.47 | 65.07 | — | — | 8.08 | 7.38 | — | — | — | — | — | — | — |
| F3 | 36.16 | — | 22.25 | — | 22.24 | 9.53 | 4.76 | 0.10 | — | 0.24 | — | 4.73 | — |
| F4 | 35.99 | — | 11.33 | 33.72 | — | 9.42 | 4.52 | — | 0.10 | 0.24 | — | 4.69 | — |
| F5 | 35.99 | — | 11.33 | — | 33.72 | 9.42 | 4.52 | 0.10 | — | 0.24 | — | 4.69 | — |
| F6 | 58.08 | — | 11.40 | — | 11.42 | 9.46 | 4.56 | 0.10 | — | 0.24 | — | 4.73 | — |
| F7 | 58.01 | — | 11.39 | 11.34 | — | 9.45 | 4.60 | 0.10 | — | 0.25 | — | 4.86 | — |
| F8 | 58.10 | — | 11.39 | 11.42 | — | 9.49 | 4.6 | 0.08 | — | 0.2 | — | 4.72 | — |

A1 - poly(vinyl alcohol), weight average molecular weight, Mw, of 67,000 Daltons and 88% hydrolyzed commercially available from Sigma-Aldrich B1 - Polyox ™ WSR 205 poly(ethylene oxide) with a weight average molecular weight of 600,000 Daltons available from The Dow Chemical Company B2 - Polyox ™ WSR N3000 poly(ethylene oxide) with a weight average molecular weight of 400,000 Daltons available from The Dow Chemical Company C1 - Synalox 40-D50 ethylene oxide and propylene oxide copolymer with a weight average molecular weight of 900 Daltons available from The Dow Chemical Company C2 - Synalox 40-D150 ethylene oxide and propylene oxide copolymer with a weight average molecular weight of 1,900 Daltons available from The Dow Chemical Company D1 - 1,4-butanediol (100%) plasticizer available from Alfa Aesar E1 - Isobam ™ 110 poly(isobutylene-co-maleic anhydride) amide-NH$^{4+}$ commercially available from Kuraray Company Ltd.

F1 - poly(vinyl pyrrolidone) with a weight average molecular weight of 29,000 Daltons commercially available from Acros Organics F2 - poly(vinyl pyrrolidone) with a weight average molecular weight of 1,300,000 Daltons commercially available from Acros Organics G - CLOSITE NA$^+$ nanoclay (bentonite/montmorillonite) commercially available from BKY Additives Ltd.

H - Aqueous dispersion (15.3 wt %) containing magnesium stearate and potassium oleate I - BYK-016 defoamer available from BYK, USA Inc.

J - Dow Corning ™ 74 Additive, a Silicon foam control agent available from Dow Corning Corporation

TABLE 2

| Film Comp. | A3 (wt %) | B2 (wt %) | C2 (wt %) | C3 (wt %) | D1 (wt %) | D2 (wt %) | E1 (wt %) | F1 (wt %) | G (wt %) | H (wt %) | I (wt %) | J (wt %) | K (wt %) |
|---|---|---|---|---|---|---|---|---|---|---|---|---|---|
| F9 | 57.98 | 11.38 | — | 11.40 | 9.44 | — | 4.59 | 0.10 | 0.25 | — | 4.86 | — | — |
| F10 | 58.25 | 11.33 | 11.34 | — | 9.39 | — | 4.58 | 0.10 | 0.24 | — | 4.76 | — | — |
| F11 | 56.81 | 11.04 | 10.99 | — | 9.29 | — | 4.84 | 0.10 | 0.24 | — | 4.71 | — | 1.98 |
| F12 | 58.25 | 11.53 | — | 3.94 | 1.56 | 14.74 | 4.65 | 0.11 | 0.27 | — | 4.96 | — | — |
| F13 | 57.94 | 11.48 | — | 3.92 | 1.55 | 14.68 | 4.63 | 0.11 | 0.26 | — | 4.91 | — | 0.50 |
| F14 | 57.64 | 11.42 | — | 3.90 | 1.55 | 14.61 | 4.61 | 0.11 | 0.26 | — | 4.88 | — | 1.03 |
| F15 | 56.97 | 11.29 | — | 3.85 | 1.53 | 14.44 | 4.55 | 0.11 | 0.26 | — | 4.83 | — | 2.18 |
| F16 | 61.07 | 12.10 | — | 4.11 | 1.66 | 15.50 | — | 0.12 | 0.30 | — | 5.15 | — | — |
| F17 | 60.44 | 11.97 | — | 4.06 | 1.64 | 15.34 | — | 0.12 | 0.29 | — | 5.10 | — | 1.04 |

A3 - poly(vinyl alcohol), weight average molecular weight, Mw, of 150,000 Daltons and 88% hydrolyzed available from Sigma-Aldrich
B2 - Polyox™ WSR N3000 poly(ethylene oxide) with a weight average molecular weight of 400,000 Daltons available from The Dow Chemical Company
C2 - Synalox 40-D150 ethylene oxide and propylene oxide copolymer with a weight average molecular weight of 1,900 Daltons available from The Dow Chemical Company
C3 - UCON 75-H-450 ethylene oxide and propylene oxide copolymer, number average molecular weight, $M_N$, of 980 Daltons available from The Dow Chemical Company.
D1 - 1,4-butanediol (100%) plasticizer available from Alfa Aesar
D2 - Glycerol (100%) plasticizer available from Sigma-Aldrich
E1 - Isobam™ 110 poly(isobutylene-co-maleic anhydride) amide-$NH^{4+}$ commercially available from Kuraray Company Ltd.
F1 - poly(vinyl pyrrolidone) with a weight average molecular weight of 29,000 Daltons commercially available from Acros Organics
G - CLOSITE $NA^+$ nanoclay (bentonite/montmorillonite) commercially available from BKY Additives Ltd.
H - Aqueous dispersion (15.3 wt %) containing magnesium stearate and potassium oleate
I - BYK-016 defoamer available from BYK, USA Inc.
J - Dow Corning™ 74 Additive, a Silicon foam control agent available from Dow Corning Corporation
K - Calcium chloride, anhydrous (96%) complexing agent available from A cros Organics.

TABLE 3

| Film Comp. | A2 (wt %) | B2 (wt %) | C3 (wt %) | D1 (wt %) | D2 (wt %) | E1 (wt %) | E2 (wt %) | E3 (wt %) | F1 (wt %) | G (wt %) | I (wt %) | J (wt %) | K (wt %) |
|---|---|---|---|---|---|---|---|---|---|---|---|---|---|
| F18 | 58.38 | 11.58 | 3.88 | 1.57 | 14.57 | 4.67 | — | — | 0.11 | 0.27 | 4.97 | — | — |
| F19 | 58.35 | 11.57 | 3.81 | 1.50 | 14.77 | — | 4.74 | — | 0.11 | 0.26 | 4.90 | — | — |
| F20 | 58.21 | 11.56 | 3.73 | 1.63 | 14.73 | — | — | 4.78 | 0.12 | 0.28 | 4.96 | — | — |
| F21 | 58.75 | 11.15 | 3.81 | 1.51 | 14.26 | 5.36 | — | — | 0.11 | 0.25 | 4.8 | — | — |

A2 - poly(vinyl alcohol), weight average molecular weight, Mw, of 130,000 Daltons and 88% hydrolyzed available from Sigma-Aldrich
B2 - Polyox™ WSR N3000 poly(ethylene oxide) with a weight average molecular weight of 400,000 Daltons available from The Dow Chemical Company
C3 - UCON 75-H-450 ethylene oxide and propylene oxide copolymer, number average molecular weight, $M_N$, of 980 Daltons avalable from The Dow Chemical Company.
D1 - 1,4-butanediol (100%) plasticizer available from Alfa Aesar
D2 - Glycerol (100%) plasticizer available from Sigma-Aldrich
E1 - Isobam™ 110 poly(isobutylene-co-maleic anhydride) amide-$NH^+$ commercially available from Kuraray Company Ltd.
E2 - Isobam™ 10 poly(isobutylene-co-maleic anhydride) available from Kuraray Company Ltd, reacted with NaOH
E3 - Acusol™ 588 dispersant (polyacrylate copolymer) available from The Dow Chemical Company, reacted with NaOH
F1 - poly(vinyl pyrrolidone) with a weight average molecular weight of 29,000 Daltons commercially available from Acros Organics
G - CLOSITE $NA^+$ nanoclay (bentonite/montmorillonite) commercially available from BKY Additives Ltd.
I - BYK-016 defoamer available from BYK, USA Inc.
J - Dow Corning™ 74 Additive, a Silicon foam control agent available from Dow Corning Corporation
K - Calcium chloride, anhydrous (96%) complexing agent available from Acros Organics.

COMPARATIVE EXAMPLE C1 AND EXAMPLES 1-19

A film was prepared in each of Comparative Example C1 and Examples 1-19 by casting 15 to 25 grams of the film forming composition of FC1 and F1-F7 and F9-F20, respectively as noted in TABLE 4, onto a polyethylene terephthalate substrate using a stainless steel draw down bar to form a dried film with a target thickness of 76 μm. The drawn films were immediately transferred to a forced air oven and dried at 65-95° C. for 10 to 15 minutes to form a dried film. The dried films were then removed from the oven and left to equilibrate to room temperature for several hours. Once the films were equilibrated to room temperature, the films were released from the polyethylene terephthalate substrate to provide free standing films 60 to 90 μm thick.

TABLE 4

| Ex. | Film composition |
|---|---|
| C1 | Comparative Example FC1 |
| 1 | Example F1 |
| 2 | Example F2 |
| 3 | Example F3 |
| 4 | Example F4 |
| 5 | Example F5 |
| 6 | Example F6 |
| 7 | Example F7 |
| 8 | Example F9 |
| 9 | Example F10 |
| 10 | Example F11 |
| 11 | Example F12 |
| 12 | Example F13 |
| 13 | Example F14 |
| 14 | Example F15 |
| 15 | Example F16 |
| 16 | Example F17 |
| 17 | Example F18 |
| 18 | Example F19 |
| 19 | Example F20 |

Cold Water Solubility Testing

A commercially available modified polyvinyl hydroxide film and the free standing films from Comparative Example C1 and Examples 1-19 were tested for cold water solubility by taking test strips (0.5" wide×1.5" long) from each free standing film and placing same into a separate container with 20 mL of tap water. The test strips were allowed to sit undisturbed for approximately 2 mins before shaking the container for 60 seconds by hand. The container contents were then filtered through a 25 μm mesh screen. The following rating scale based on observation of the container contents pre-filtering and of the residue on the mesh screen was used to characterize the overall cold water solubility for the subject free standing films.

Excellent=Clear solution, no residue on screen
Very Good=Slight haze, no residue on screen
Good=low residue/fine grit on screen
Fair=large amount of residue/grit on screen
Poor=large intact film fragments on screen The results of the analyses are provided in TABLE 5.

TABLE 5

| Film Tested | Cold water solubility |
|---|---|
| modified polyvinyl hydroxide film* | Excellent |
| Comparative Example C1 | Excellent |
| Example 1 | Excellent |
| Example 2 | Excellent |
| Example 3 | Very Good |
| Example 4 | Very Good |
| Example 5 | Very Good |
| Example 6 | Very Good |
| Example 7 | Very Good |
| Example 8 | Very Good |
| Example 9 | Very Good |
| Example 10 | Very Good |
| Example 11 | Very Good |
| Example 12 | Very Good |
| Example 13 | Very Good |
| Example 14 | Very Good |
| Example 15 | Very Good |
| Example 16 | Very Good |
| Example 17 | Very Good |
| Example 18 | Very Good |
| Example 19 | Very Good |

*Monosol ™ M8630 modified polyvinyl hydroxide film available from MonoSol LLC

Storage Stability Testing

A commercially available modified polyvinyl hydroxide film and the free standing films from Comparative Example C1 and Examples 1-19 were tested for storage stability by physically examining the films for brittleness and stickiness or residue following storage at ambient temperatures (68-72° F.) and low (18-23% relative humidity) and high (68-70% relative humidity). A pass/fail rating scale was used, wherein pass=film maintained toughness and flexibility after storage at conditions for 1 week
fail=film becomes brittle after storage at conditions for 1 week.

The free standing films were also observed for the present of residue. The following rating scale was used None=no oily residue observed on film surface
Low=low oily residue observed on film surface
Moderate=moderate oily residue observed on film surface
Heavy=significant amount of oily residue observed on film surface The free standing films were evaluated for blocking (unwanted adhesion) by rolling the film onto itself under moderate hand pressure for several minutes and then unrolling the film. The results of the analyses are provided in TABLE 6.

TABLE 6

| | Storage Stability | | | |
|---|---|---|---|---|
| Film Tested | Low | High | Residue | Blocking |
| modified polyvinyl hydroxide film* | Pass | Pass | None | No |
| Comparative Example C1 | Pass | Pass | Moderate | No |
| Example 1 | Pass | Pass | None | No |
| Example 2 | Pass | Pass | None | No |
| Example 3 | Pass | Pass | Low | No |
| Example 4 | Pass | Pass | Low | No |
| Example 5 | Pass | Pass | Low | No |
| Example 6 | Pass | Pass | None | No |
| Example 7 | Pass | Pass | None | No |
| Example 8 | Pass | Pass | None | No |
| Example 9 | Pass | Pass | None | No |
| Example 10 | Pass | Pass | None | No |
| Example 11 | Pass | Pass | None | No |
| Example 12 | Pass | Pass | None | No |
| Example 13 | Pass | Pass | None | No |
| Example 14 | Pass | Pass | None | No |
| Example 15 | Pass | Pass | None | No |
| Example 16 | Pass | Pass | None | No |
| Example 17 | Pass | Pass | None | No |
| Example 18 | Pass | Pass | None | No |
| Example 19 | Pass | Pass | None | No |

*Monosol ™ M8630 modified polyvinyl hydroxide film available from MonoSol LLC.

Properties Testing

Mechanical properties of water soluble films believed useful in thermoforming water-soluble containers, include Tensile Stress at 100% elongation, Young's Modulus and Break Stress are critical for successful thermoforming and also in the film's ability to hold the required amount of liquid detergent. Mechanical properties of the commercially available modified polyvinyl hydroxide film and the free standing films from Comparative Example C1 and Examples 1-19 were measured using a Tinius Olsen Model H10K-S benchtop materials tester available from Tinius Olsen and film samples (3.0 inch long×0.5 inch wide). The tensile testing was performed according to ASTM D882 using a 1.2 inch gauge length at a test speed of 20 inch/min under ambient conditions in a controlled temperature and humidity room with a temperature and humidity of 71° F. and 53% relative humidity. The Elasticity Index, which is obtained by the ratio of tensile Stress at 100% Elongation and Young's Modulus (also known as Elastic Modulus) was used to predict the film's ability to undergo elastic (recoverable) or plastic (non-recoverable) deformation. A rating scale for Elastic Index was as follows.

Excellent=0.5 or higher
Very Good=0.4 to 0.49
Good=0.3 to 0.39
Fair=0.2 to 0.29
Poor=0.19 or lower Without wishing to be bound by theory, it is believed that films having an Elasticity Index that is above 0.5 may provide for an elastic film that recovers back to its original shape and length upon stretch. Such a film provides for a firm and "inflated" pouch, or a full and plumb pouch. On the other hand, it is believed that a film having an Elasticity Index that is too low, i.e. less than about 0.2, is inelastic and may provide for a pouch that undergoes plastic deformation and hence does not return to its original length upon stretch. Such a pouch will appear limp and weak. The results of the analyses are provided in TABLE 7.

TABLE 7

| | Tensile Properties | | | | |
|---|---|---|---|---|---|
| Film | Elongation (%) | Stress @ 100% Elongation (MPa) | Ultimate Break Stress (MPa) | Young's Modulus (MPa) | Elasticity Index |
| modified polyvinyl hydroxide film* | 856 | 8.5 | 40.1 | 17.0 | 0.50 |
| Comparative Example FC1 | 1259 | 1.7 | 5.2 | 5.8 | 0.29 |
| Example 1 | 1092 | 4.6 | 9.2 | 41.1 | 0.11 |
| Example 2 | 1733 | 6.4 | 19.9 | 59.0 | 0.11 |
| Example 3 | 490 | 3.8 | 6.9 | 12.3 | 0.31 |
| Example 4 | 596 | 3.9 | 8.9 | 8.8 | 0.44 |
| Example 5 | 520 | 2.6 | 5.4 | 6.7 | 0.39 |
| Example 6 | 714 | 7.4 | 20.5 | 19.0 | 0.39 |
| Example 7 | 442 | 6.0 | 12.8 | 16.0 | 0.38 |
| Example 8 | 460 | 7.8 | 24.7 | 21.0 | 0.37 |
| Example 9 | 435 | 8.0 | 21.5 | 24.1 | 0.33 |
| Example 10 | 389 | 6.4 | 17.4 | 22.0 | 0.29 |
| Example 11 | 525 | 6.2 | 24.8 | 18.2 | 0.34 |
| Example 12 | 452 | 6.2 | 22.9 | 20.8 | 0.30 |
| Example 13 | 505 | 6.7 | 23.0 | 23.6 | 0.28 |
| Example 14 | 478 | 5.9 | 21.1 | 22.2 | 0.27 |
| Example 15 | 626 | 6.1 | 24.6 | 16.7 | 0.37 |
| Example 16 | 623 | 6.0 | 27.3 | 16.4 | 0.37 |
| Example 17 | 520 | 5.6 | 21.1 | 13.7 | 0.41 |
| Example 18 | 469 | 5.6 | 20.6 | 14.1 | 0.40 |
| Example 19 | 435 | 6.3 | 17.5 | 18.7 | 0.34 |

*Monosol ™ M8630 modified polyvinyl hydroxide film available from MonoSol LLC.

COMPARATIVE EXAMPLE PC2 AND EXAMPLES P1-P19

Unit Dose Pouches

In each of Comparative Examples PC2 and Examples P1-P19 the unit dose pouch was prepared manually from two film pieces cut to 3 inch×2 inch from a film having the film composition noted in TABLE 8. The film pieces were stacked and heat sealed together along three edges to form an open pouch. The open pouch was then filled with 20 g of detergent. Then the fourth (open) edge of the pouch was then heat sealed to form the completed unit does pouch.

The detergent used in each of Comparative Example PC2 and Examples P1-P19 was prepared by combining in a 100 mL glass jar 15.4 g of anionic surfactant (Alpha-Step® PC anionic surfactant available from Stepan Company); 2.9 g of high active nonionic surfactant (Bio-Soft® N25-7 high active nonionic surfactant available from Stepan Company); and 2.8 g aqueous concentrated sodium lauryl ether sulfate solution (Steol® CS 270 aq. conc. sodium lauryl ether sulfate solution available from Stepan Company) and mixed using a FlackTek Speedmixer (Model DAC 150 FVZ-K) at 3540 rpm for one minute to form a slurry. Then, 6.0 g of deionized water was added to the slurry with mixing. Then, 3.0 g sodium chloride was added to the glass jar and the contents were mixed in the FlackTek Speed mixer at 3540 rpm for 3 minutes. The product detergent formulation was allowed to equilibrated overnight before use. The water content of the product detergent formulation was measured at 54 wt % by Karl-Fisher titration.

Unit Dose Pouch Accelerated High Temp. High Humidity Storage Stability

The unit does pouches were then placed in a small zip-lock bag and stored in a 37° C. and 70% relative humidity environment for 14 days. The unit dose pouches were then evaluated for any signs of film failure. The results of the observations are provided in TABLE 8.

Unit Dose Pouch Water Solubility/Dispersibility

Following the 14 day storage, each unit dose pouch was placed into a 1 L bottle filled with tap water. The contents of the 1 L bottle were then agitated with a stir bar for a period of 30 minutes and then evaluated for pouch solubility by filtering the bottle contents through a 25 μm mesh screen. The following rating scale based on observation of the bottle contents pre-filtering and of the residue on the mesh screen was used to characterize the overall cold water solubility for the subject free standing films.

Excellent≡Clear solution, no residue on screen

Very Good≡Slight haze, no residue on screen

Good≡low residue/fine grit on screen

Fair≡large amount of residue/grit on screen

Poor≡large intact film fragments on screen

The results of the observations are provided in TABLE 8.

TABLE 8

| | | Unit Dose Pouch | |
|---|---|---|---|
| Unit Dose Pouch | Film | Storage Stability | Dissolution after storage |
| Comp. Example PC2 | * | Stable/Intact | Poor |
| Example P1 | Ex. 1 | Not stable after 1 hr | — |
| Example P2 | Ex. 2 | Not stable after 1 hr | — |
| Example P3 | Ex. 3 | Not stable after 2.5 days | — |
| Example P4 | Ex. 4 | Stable/Intact | Very Good |
| Example P5 | Ex. 5 | Stable/Intact | Fair |
| Example P6 | Ex. 6 | Stable/Intact | Fair |
| Example P7 | Ex. 7 | Stable/Intact | Good |
| Example P8 | Ex. 8 | Stable/Intact | Fair |
| Example P9 | Ex. 9 | Stable/Intact | Fair |
| Example P10 | Ex. 10 | Stable/Intact | Very Good |
| Example P11 | Ex. 11 | Stable/Intact | Fair |
| Example P12 | Ex. 12 | Stable/Intact | Very Good |
| Example P13 | Ex. 13 | Stable/Intact | Very Good |
| Example P14 | Ex. 14 | Stable/Intact | Very Good |

TABLE 8-continued

| Unit Dose Pouch | Film | Unit Dose Pouch Storage Stability | Dissolution after storage |
|---|---|---|---|
| Example P15 | Ex. 15 | Stable/Intact | Very Good |
| Example P16 | Ex. 16 | Stable/Intact | Very Good |
| Example P17 | Ex. 17 | Stable/Intact | Fair |
| Example P18 | Ex. 18 | Stable/Intact | Very Good |
| Example P19 | Ex. 19 | Stable/Intact | Very Good |

\* - Monosol ™ M8630 modified polyvinyl hydroxide film available from MonoSol LLC.

EXAMPLES 20-21

A film was prepared in each of Examples 20-21 by casting 15 to 25 grams of the film forming composition of F8 and F21, respectively as noted in TABLE 9, onto a Mylar substrate using a #50 drawdown bar (available from Paul N. Gardner Company, Inc.). The drawn films were immediately transferred to a forced air oven and dried at 65-95° C. for 30 minutes to form a dried film. The dried films were then removed from the oven and left to equilibrate to room temperature for several hours. Once the films were equilibrated to room temperature, the films were released from the Mylar substrate to provide free standing films about 120 μm thick.

TABLE 9

| Ex. | Film composition |
|---|---|
| 20 | Example F9 |
| 21 | Example F21 |

COMPARATIVE EXAMPLES CS1-CS15 AND EXAMPLES S1-S6

Sealing Compositions

The sealing compositions in each of Comparative Examples CS1-CS15 and Examples S1-S6 were prepared by combining and mixing together the components listed in TABLE 10.

TABLE 10

| | Water | Hydrogen bonding component | | Complex forming component | |
|---|---|---|---|---|---|
| Ex. | (wt %) | Component | (wt %) | Component | (wt %) |
| S1 | 80 | butane diol | 10 | CaCl$_2$ | 10 |
| S2 | 98 | butane diol | 1 | CaCl$_2$ | 1 |
| S3 | 80 | ethylene glycol | 10 | CaCl$_2$ | 10 |
| S4 | 90 | citric acid | 6.34 | CaCl$_2$ | 3.66 |
| S5 | 80 | Sorbitol | 10 | CaCl$_2$ | 10 |
| S6 | 98 | ethylene glycol | 1 | CaCl$_2$ | 1 |
| CS1 | 90 | citric acid | 10 | — | — |
| CS2 | 99 | citric acid | 1 | — | — |
| CS3 | 90 | — | — | CaCl$_2$ | 10 |
| CS4 | 80 | — | — | CaCl$_2$ | 20 |
| CS5 | 90 | butane diol | 10 | — | — |
| CS6 | 90 | ethylene glycol | 10 | — | — |
| CS7 | 100 | — | — | — | — |
| CS8 | 90 | sorbitol | 10 | — | — |
| CS9 | 99 | PVOH (Mowiol 18-88) | 1 | — | — |
| CS10 | 90 | PVOH (Mowiol 18-88) | 10 | — | — |
| CS11 | 99 | Polyox WSR N3000 | 1 | — | — |
| CS12 | 93 | Polyox WSR N3000 | 7 | — | — |
| CS13 | 99 | Isobam | 1 | — | — |
| CS14 | 90 | Isobam | 10 | — | — |
| CS15 | — | — | — | — | — |

COMPARATIVE EXAMPLES CST1-CST18 AND EXAMPLES 22-27

Seal Strength Testing

The seal strength for sealing compositions prepared according to Comparative Examples CS1-CS15 and Examples S1-S5 were tested by taking two pieces of water soluble film prepared according to either Example 20 or 21 (as noted in TABLE 11) cut with a dye to size of 8 mm×38 mm. In each seal strength test, the noted sealing composition was applied to the end of one of the first piece of water soluble film using a cotton swab. The second piece of water soluble film was then placed over the first film with the applied sealing composition interposed between the film pieces. The two pieces of water soluble film were then placed between two aluminum plates in a compression molding machine. A compressive force of 34.5 MPa was then applied to the sandwiched film pieces for two minutes with an applied temperature as noted in TABLE 11.

The peel strength of the sealing composition and film formulation combinations in Comparative Examples CST1-CST18 and Examples 22-27 were tested using an Instron Model 5564 table mounted materials testing system equipped with a 100 N load cell applying a 50.8 mm/min pull rate. Each combination was tested in triplicate, with the average value reported in TABLE 11.

TABLE 11

| | | Sealing | Sealing Max Load (N) | |
|---|---|---|---|---|
| Ex. | Film | Composition | at 40° C. | at 23° C. |
| 22 | Example F21 | Example S1 | 9.8 | 9.5 |
| 23 | Example F21 | Example S2 | 6 | 9.6 |
| 24 | Example F21 | Example S3 | 8.3 | 6.6 |
| 25 | Example F21 | Example S4 | 5.8 | 6.4 |
| 26 | Example F21 | Example S5 | 5.2 | — |
| 27 | Example F8 | Example S1 | 9.7 | — |
| CST1 | Example F21 | Example CS1 | 9.7 | 11 |
| CST2 | Example F21 | Example CS2 | 7.6 | 7.1 |
| CST3 | Example F21 | Example CS3 | 3.9 | — |
| CST4 | Example F21 | Example CS4 | 4.6 | — |
| CST5 | Example F21 | Example CS5 | 2.7 | — |
| CST6 | Example F21 | Example CS6 | 5.3 | — |
| CST7 | Example F21 | Example CS7 | 3.1 | — |
| CST8 | Example F21 | Example CS8 | 3.7 | — |
| CST9 | Example F21 | Example CS9 | 2.7 | — |
| CST10 | Example F21 | Example CS10 | 4.4 | — |
| CST11 | Example F21 | Example CS11 | 3.4 | — |
| CST12 | Example F21 | Example CS12 | 3.4 | — |
| CST13 | Example F21 | Example CS13 | 0.6 | — |
| CST14 | Example F21 | Example CS14 | 0.5 | — |
| CST15 | Example F21 | Example CS15 | 4.9 | — |
| CST16 | Example F8 | Example CS3 | 4.5 | — |
| CST17 | Example F8 | Example CS4 | 4.7 | — |
| CST18 | Example F8 | Example CS5 | 2 | — |

COMPARATIVE EXAMPLE PC3-PC7 AND
EXAMPLES P20-P24

Unit Dose Pouches

In each of Comparative Examples PC3-PC7 and Examples P20-P25 the unit dose pouch was prepared manually from two film pieces cut to 8 cm×8 cm from a film having the film composition noted in TABLE 12. The film pieces were then shaped into a concave bowl like surface using vacuum. The detergent solution (~20 g) was then pipetted into the bottom bowl shaped film piece. The outside edges of the bottom bowl shaped film piece was then wetted with the sealing composition as noted in TABLE 12 using a cotton swab. The top bowl shaped film piece was placed over the bottom film piece. The outside edges of the bottom bowl shaped film piece and the top bowl shaped film piece were then clamped together for 15 minutes to form a detergent filled pouch. The width of the sealing composition formed seals were about 3 mm. The heat seals were prepared using a sealer and had a width of about 2 mm.

The detergent used in each of Comparative Examples PC3-PC7 and Examples P20-P25 was prepared by combining in a 100 mL glass jar 20 g of anionic surfactant (Alpha-Step® PC 48 anionic surfactant available from Stepan Company); 10 g of high active nonionic surfactant (Bio-Soft® N25-7 high active nonionic surfactant available from Stepan Company); and 10 g aqueous concentrated sodium lauryl ether sulfate solution (Steol® CS 270 aq. conc. sodium lauryl ether sulfate solution available from Stepan Company) and mixed using a FlackTek Speedmixer (Model DAC 150 FVZ-K) at 3540 rpm for one minute to form a slurry. Then, the contents of the glass jar were diluted with deionized water with mixing. Then, 7 g sodium chloride was added to the glass jar and the contents were mixed in the FlackTek Speed mixer at 3540 rpm for 3 minutes. The product detergent formulation was allowed to equilibrate overnight before use. The water content of the product detergent formulation was measured at 54 wt % by Karl-Fisher titration. The pH of the detergent formulation was 4.5.

Unit Dose Pouch: Accelerated High Temp. High Humidity Storage Stability

The unit does pouches were then placed in an open zip-lock bag and stored in a 37° C. and 70% relative humidity environment for 14 days. The unit dose pouches were then evaluated for any signs of film failure. The results of the observations are provided in TABLE 12.

Unit Dose Pouch: Water Solubility/Dispersibility

Following the 14 day storage, each unit dose pouch was cut up to obtain portions of the film (from non-sealed regions) and of sealed portions of the film for testing. The various film portions were then separately placed into a 1 L bottle filled with 800 mL of tap water. The contents of the 1 L bottle were then agitated with a stir bar for a period of 20 minutes with observation. If the contents of the 1 L bottle were not completely dissolved during the 20 minute agitation period, the solutions were observed and the following ratings were assigned.

3≡good≡low residue/fine grit on screen
2≡Fair≡large amount of residue/grit on screen
0-1≡Poor≡large intact film fragments on screen The results of the observations are provided in TABLE 12.

Unit Dose Pouch: Compression Burst Testing

The seal strength of the sealing compositions was also compared by compressive burst testing according to AISE recommendations corresponding to CLP implementation guidelines (CLP Regulation (EC) No. 1272/2008). Prior to the compressive burst testing, unit dose pouches were placed in an open zip-lock bag and stored in a 21° C. and 52-53% relative humidity environment for 16-24 hours before compression testing in compliance with ASTM Standard D4332-13 for conditioning of such containers prior to testing. Each unit dose pouch was centered in an open zip-lock bag under a TA-40 compression plate with the aid of a TA-90 stand. The load cell used for the tests was a 500 N load cell with the following test conditions: Pre-test speed—60.0 mm/min; test speed—250.0 mm/min; post-test speed—600 mm/min; target mode—17 mm (or 95% strain). The maximum compressive force is reported in TABLE 12 represents the unit does pouch burst strength. The values listed in TABLE 12 are the average of two separate tests.

TABLE 12

| | | | Dissolution Time (min.) | | | Burst Strength | | |
|---|---|---|---|---|---|---|---|---|
| Unit Dose Pouch | Film | Seal Comp. | Unit Dose Pouch Pre-measurement Storage Stability | Film | Sealed Film | Unit Dose Pouch Pre-measurement Storage Stability | Max. Force (N) |
| Comp. Example PC3 | F8 | CS15 | intact | 7.20 | A | — | — |
| Comp. Example PC4 | F21 | CS15 | intact | 7.35 | B | — | — |
| Comp. Example PC5 | F21 | CS5 | leaked | 8.17 | — | — | — |
| Comp. Example PC6 | F21 | CS1 | leaked | 5.17 | 11.08 | — | — |
| Comp. Example PC7 | F21 | CS2 | leaked | 4.93 | 9.10 | — | — |
| Example P20 | F8 | S1 | intact | 7.20 | 8.52 | — | — |
| Example P21 | F21 | S1 | intact | 7.35 | 16.03 | intact | 318 |
| Example P22 | F21 | S2 | intact | 5.38 | 13.15 | — | — |
| Example P23 | F21 | S4 | intact | 6.03 | 10.15 | intact | 442 |
| Example P24 | F21 | S6 | — | — | — | leaked | — |
| Example P25 | F21 | S3 | — | — | — | intact | 261 |

A = Fair = large amount of grit/residue present
B = Poor = large film fragments or film mostly intact

We claim:

1. A method of forming a unit dose package, comprising:
providing a free standing film, comprising:
19 to 85 wt % of a partially hydrolyzed polyvinyl acetate;
5 to 70 wt % of a poly(ethylene oxide) having a weight average molecular weight of 20,000 to 2,000,000 Daltons;
1 to 35 wt % of a polyalkylene glycol having a weight average molecular weight of 250 to 5,300 Daltons;
0.5 to 25 wt % of a plasticizer;
1 to 7.5 wt % of a poly(isobutylene-co-maleic anhydride) copolymer, wherein the poly(isobutylene-co-maleic anhydride) copolymer is at least partially neutralized;
0.01 to 1.8 wt % of the polyvinyl pyrrolidone; and
0 to 10 wt % of an optional additive selected from the group consisting of a preservative, an antioxidant, a viscosity modifier, a solubility modifier, an antimicrobial agent, a builder, a chelating agent, a filler, an extender, a crosslinking agent, a defoamer, a salt, a lubricant, a release agent, an anti-blocking agent, a tackifier, a coalescent, a detackifying agent and a nanoparticle;
providing a sealing composition comprising:
69 to 98 wt % water;
1 to 30 wt % of a hydrogen bonding component selected from the group consisting of ethylene-1,2-diol; propane-1,3-diol; butane-1,4-diol; citric acid and mixtures thereof; and
1 to 30 wt % of a complex forming component selected from the group consisting of magnesium chloride, calcium chloride, lithium chloride and mixtures thereof;
applying the sealing composition to a first surface of the free standing film;
contacting a second surface of the free standing film with the sealing composition applied on the first surface to form a seal between the first surface and the second surface.

2. The method of claim 1, wherein the free standing film provided consists of
34 to 70 wt % of the partially hydrolyzed polyvinyl acetate, wherein the partially hydrolyzed polyvinyl acetate is 87 to 90% hydrolyzed;
10 to 15 wt % of the poly(ethylene oxide);
4 to 7.5 wt % of the polyalkylene glycol, wherein the polyalkylene glycol is a random copolymer of ethylene oxide and propylene oxide;
12 to 20 wt % of the plasticizer, wherein the plasticizer is a mixture of 1,4-butanediol and 1,2,3-propanetriol;
4 to 5.5 wt % of the poly(isobutylene-co-maleic anhydride) copolymer;
0.08 to 0.2 wt % of the polyvinyl pyrrolidone, wherein the polyvinyl pyrrolidone has a weight average molecular weight of 20,000 to 50,000 Daltons; and
0 to 10 wt % of the optional additive.

3. The method of claim 2, wherein the weight ratio of the partially hydrolyzed polyvinyl acetate to the polyvinyl pyrrolidone is 150:1 to 600:1.

4. The method of claim 3, wherein the free standing film provided includes at least one optional additive selected from the group consisting of a nano clay, a defoamer, a crosslinking agent and mixtures thereof.

5. The method of claim 4, wherein the free standing film provided contains:
0.05 to 0.2 wt % of the polyvinyl pyrrolidone;
wherein the free standing film provided includes the nano clay and the defoamer; and wherein the free standing film contains:
0.1 to 0.5 wt % of the nano clay; and
3 to 7 wt % of the defoamer.

6. The method of claim 1, wherein the sealing composition provided, consists of
87.5 to 92.5 wt % water,
2 to 12.5 wt % of the hydrogen bonding component; and
2 to 12.5 wt % of the complex forming component.

7. A unit dose package produced by the method of claim 6.

8. The method of claim 6, wherein the free standing film provided consists of
34 to 70 wt % of the partially hydrolyzed polyvinyl acetate, wherein the partially hydrolyzed polyvinyl acetate is 87 to 90% hydrolyzed;
10 to 15 wt % of the poly(ethylene oxide);
4 to 7.5 wt % of the polyalkylene glycol, wherein the polyalkylene glycol is a random copolymer of ethylene oxide and propylene oxide;
12 to 20 wt % of the plasticizer, wherein the plasticizer is a mixture of 1,4-butanediol and 1,2,3-propanetriol;
4 to 5.5 wt % of the poly(isobutylene-co-maleic anhydride) copolymer;
0.08 to 0.2 wt % of the polyvinyl pyrrolidone, wherein the polyvinyl pyrrolidone has a weight average molecular weight of 20,000 to 50,000 Daltons; and
0 to 10 wt % of the optional additive.

9. The method of claim 8, wherein the weight ratio of the partially hydrolyzed polyvinyl acetate to the polyvinyl pyrrolidone is 150:1 to 600:1.

10. The method of claim 9, wherein the free standing film provided includes at least one optional additive selected from the group consisting of a nano clay, a defoamer, a crosslinking agent and mixtures thereof.

11. The method of claim 10, wherein the free standing film provided contains:
0.05 to 0.2 wt % of the polyvinyl pyrrolidone;
wherein the free standing film provided includes the nano clay and the defoamer; and wherein the free standing film contains:
0.1 to 0.5 wt % of the nano clay; and
3 to 7 wt % of the defoamer.

12. The method of claim 11, further comprising:
providing a detergent formulation, comprising:
14 to 60 wt % of a surfactant;
3 to 25 wt % of a salt; and
20 to 75 wt % of water;
wherein the free standing film forms a cavity; wherein the detergent formulation is disposed within the cavity; wherein the cavity is encapsulated by the free standing film with the seal between the first surface and the second surface; and wherein the detergent formulation is in contact with the free standing film.

13. The method of claim 12, wherein the hydrogen bonding component is selected from ethylene-1,2-diol; propane-1,3-diol and butane-1,4-diol.

14. The method of claim 13, wherein the hydrogen bonding component is selected from ethylene-1,2-diol and butane-1,4-diol.

15. A unit dose package produced by the method of claim 14.

* * * * *